Oct. 19, 1948.    A. F. KENYON ET AL    2,451,957
CONTROL SYSTEM FOR ELECTRIC MOTORS
Filed July 9, 1946
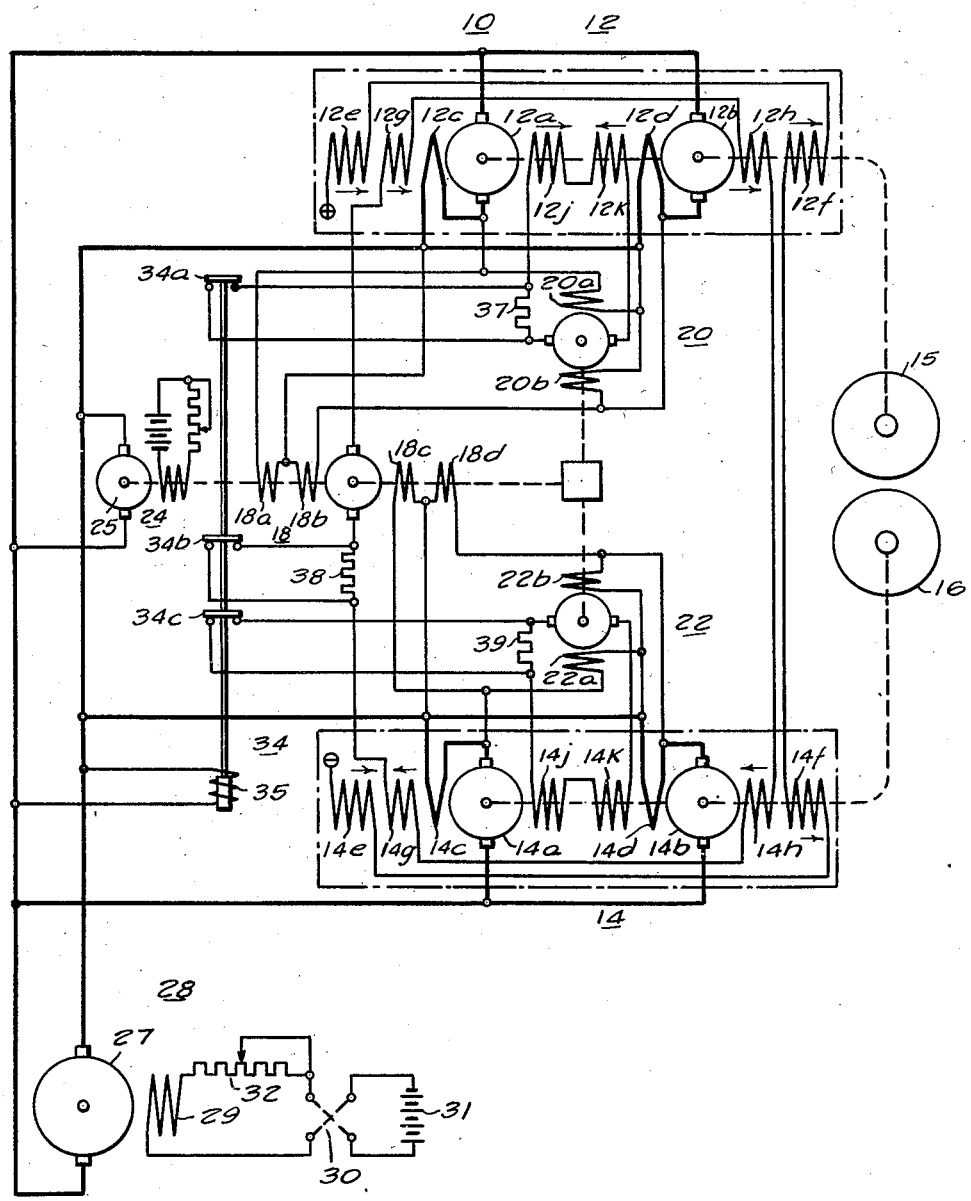
WITNESSES:
INVENTORS
Alonzo F. Kenyon and
William R. Harding.
BY
ATTORNEY

UNITED STATES PATENT OFFICE 2,451,957

CONTROL SYSTEM FOR ELECTRIC MOTORS

Alonzo F. Kenyon, Churchill, and William R. Harding, Export, Pa., assignors to Westinghouse Electric Corporation, East Pittsburgh, Pa., a corporation of Pennsylvania Application July 9, 1946, Serial No. 682,190

8 Claims. (Cl. 318—52)

Our invention relates generally to control systems, and it has reference in particular to motor control systems.

Generally stated, it is an object of our invention to provide a motor control system which is simple and inexpensive to manufacture, and which is reliable and efficient in operation.

More specifically, it is an object of our invention to provide for controlling the polarity of a control generator or exciter for a reversing motor by controlling its direction of operation in accordance with the direction of operation of the motor.

It is also an object of our invention to provide a simple and effective system for balancing the load between a pair of motors.

Another object of our invention is to provide for reversing the series excitation of a motor as the motor reaches zero speed during a reversing operation.

It is also an important object of our invention to provide for balancing both the driving and braking loads between a pair of motors.

Yet another object of our invention is to provide for controlling the operation of a control generator or exciter in accordance with the differential between the armature currents of a pair of motors having a common load, and cumulatively and differentially energizing the compounding field windings of the motors having the greater and the lesser armature currents, respectively.

Other objects will in part be obvious, and will in part be explained hereinafter.

In practicing our invention in one of its forms, the proper division of load between a pair of motors is maintained by means of compounding field windings which are energized from a control generator whose field excitation is responsive to the differential between the armature currents of the motors. The control generator is driven by a motor which is energized from the same source as are the motor armatures, so that upon reversal of the voltage applied to the motor armatures the direction of operation of the control generator is also reversed.

For a more complete understanding of the nature and scope of our invention, reference may be made to the following detailed description, which may be read in connection with the accompanying drawing, in which the single figure is a diagrammatic view of a motor control system embodying the invention in one of its forms.

Referring to the drawing, the reference numeral 10 may denote generally a motor control system wherein a pair of electric motors 12 and 14 may be connected in driving relation with a common load such as the upper and lower rolls 15 and 16, respectively, of a rolling mill, constituting a twin-motor drive. The motors 12 and 14 may be of any suitable type comprising, for example, twin armatures 12a, 12b, 14a, and 14b, having commutating field windings 12c, 12d and 14c, 14d, respectively. The motors also may be provided with separately excited main field windings 12e, 12f and 14e, 14f, respectively, which may be energized from a suitable source of electrical energy. Additional compounding field windings 12g, 12h, 12j, 12k and 14g, 14h, 14j, 14k may also be provided.

Excitation of the compounding field windings may be provided by control generators 18, 20 and 22. The field windings 18a, 18b, 18c and 18d of the control generator 18 may be energized in accordance with the currents flowing in the armatures 12a, 12b, 14a and 14b, respectively. The field windings 18a, 18b, 18c and 18d may be, for example, so connected in shunt relation with interpole windings 12c, 12d, and 14c, 14d, respectively, that any increase in the load on the motor 12 relative to the load on the motor 14 causes the control generator 18 to so energize the field windings 12g, 12h and 14g, 14h as to increase the total excitation of the motor 12 and decrease the total excitation of the motor 14, and vice versa.

The field windings 12j, 12k of the motor 12 and the field windings 14j, 14k of the motor 14 may be energized from the control generators 20 and 22, respectively. Excitation of the control generator 20 may be provided by connecting its field windings 20a and 20b in shunt relation with the interpole windings 12c and 12d of the armatures 12a and 12b, respectively. The windings may be so connected that an increase in load on the armature 12a relative to the load on the armature 12b results in energization of the field windings 12j and 12k so as to increase the total excitation of the armature 12a and decrease the total excitation of the armature 12b. In a like manner, field windings 14j and 14k of the motor 14 may be energized from the control generator 22 which may have field windings 22a and 22b connected in shunt relation with the interpole windings 14c and 14d of the motor 14. The field windings 22a and 22b may be so energized that an increase in load on the armature 14a relative to the load on armature 14b causes the generator 22 to energize the field winding 14j and 14k in such senses as to increase the total excitation of the armature 14a and decrease the total excitation of armature 14b.

In order to provide for varying the excitation of the field windings of the motors 12 and 14 in accordance with the speed of the motors, and for maintaining the same polarity of the voltage applied thereto as the motors pass through the zero speed point during reversal, operation of the control generators 20 and 22 may be effected in accordance with the speed and direction of the roll motors 12 and 14. The control generators may be driven mechanically from the roll motors, or an auxiliary motor 24 may be used to operate the control generators 18, 20 and 22. The armature 25 of the motor 24 may be energized from the same source as are the armatures 12a, 12b and 14a, 14b. The armatures may, for example, be electrically connected to the armature 27 of a main generator 28 having a field winding 29 which may be energized through a reversing switch 30 from a suitable source of excitation represented by the battery 31. Suitable means may be provided for varying the voltage of the generator 28, such as the rheostat 32.

With the control generators driven by a motor supplied from the same source as the main motors 12 and 14, the control generator output, and hence motor compounding excitations and load balancing effect will be smaller when operating at low speeds than when operating at high speeds. However, at low speeds, the resistances of the motor armature circuits provide a considerable load balancing effect due to the IR drop being a considerable portion of the total applied voltage, and in general the reduced balancing effect from the control generators will be sufficient to assume stable parallel operation. If more balancing is required at low speeds, means such as the low voltage relay 34 may be provided, if desired. The operating winding 35 of this relay may be connected across the armature 27 of the main generator 28 and normally closed contact members 34a, 34b and 34c may be provided for shunting control resistors 37, 38 and 39 connected in circuit relation with the control generators 20, 18 and 22, respectively. The relay 34 may be arranged to shunt the control resistors whenever the voltage of the main generator 28 drops below a predetermined value.

In operation, the excitations of the two field windings 20a and 20b of the control generator 20, for example, will be equal and of opposite polarity so long as the armatures 12a and 12b of the motor 12 carry equal armature or load currents. The output of the control generator 20 is, therefore, zero. Should one armature, for example the armature 12a, tend to take more than its share of the load, the current through the armature 12a increases, so that the excitation of the field winding 20a becomes larger than the excitation of field winding 20b. The output voltage of the control generator 20 will, therefore, be such as to circulate a current through the field windings 12j and 12k in such a direction as to be cumulative with respect to the separate excitation of the field winding 12e of the armature 12a and differential with respect to the separately excited field winding 12f of the armature 12b. The total excitation of the armature 12a is, herefore, increased, while that of the armature 12b is decreased, thereby restoring the balance of load between the two armatures. Any tendency of the armature 12b to carry more than its share of the load causes the output of the control generator 20 to reverse, and restore the balance of load in a similar manner.

When the direction of rotation of the motor 12 is reversed by operating the reversing switch 30 and reversing the polarity of the voltage applied to the armatures 12a and 12b by the main generator 28, the excitations of the field windings of the control generator 20 are reversed. Since the control generator 20 is driven by the motor 24, which is also energized from the main generator 28, the direction of rotation of the control generator is also reversed, thus retaining the same control generator polarity and providing the same compounding excitation for the armatures 12a and 12b. Load balancing between the armatures 12a and 12b is, therefore, effected in the same manner as before.

When both armatures, 12a and 12b, are operating at full speed and the reversing switch 30 is moved to the opposite position, the voltage of the main generator 28 is decreased and reversed, thus causing the motors 12 and 14 to regenerate. The control generator 20 continues to rotate in the original direction until the voltage from the main generator 28 drops to zero. Accordingly, if the armature 12a tends to take more than its share of load during regeneration, the control generator excitation of the field windings 12j and 12k will be opposite to that when motoring. The total excitation of the armature 12a will, therefore, be reduced, while that of the armature 12b will be increased, thus effecting restoration of the balance between the armatures 12a and 12b.

The operation of the control generator 22 in connection with the armatures 14a and 14b of the motor 14 is substantially similar to that for the control generator 20.

The proper balance of load between the motors 12 and 14 is obtained in a like manner through the functioning of control generator 18. Since the field windings 18a and 18b are energized in accordance with the load currents of the armatures 12a and 12b, while the field windings 18c and 18d are energized in accordance with the load currents of the armatures 14a and 14b, the output of the control generator 18 is proportional to the differential between the total load currents of the motors 12 and 14. The excitation of the field windings 12g, 12h, 14g and 14h from the control generator 18 is so arranged as to increase the total excitation of the motor having the greater armature current, whereby restoration of load balance between the motors is effected, in a manner similar to that described for the restoration of load balance between the separate armatures of the motors 12 and 14. The relative directions of the excitation of the various motor fields are shown by means of arrows for a condition when the motor 12a is taking more current than the motor 12b, and the motors 14 are taking less current than the motors 12.

When the motors 12 and 14 are operating at relatively low speeds, the voltage relay 34 which is energized from the same source as are the armatures 12a, 12b, 14a and 14b will return to the deenergized position when the voltage of the main generator 28 reaches a predetermined minimum value. Contact members 34a, 34b and 34c thereupon provide shunt paths about control resistors 37, 38 and 39 which are connected in series circuit relation with the armatures of the control generators 20 and 22. The effective output voltages of these control generators are thereby increased, thus increasing the total excitation of the motors 12 and 14 during motoring.

From the above description and accompanying drawing, it will be apparent that we have provided a motor control system wherein reversal of the series excitation of the motors is effectively obtained at the zero speed point of operation thereof without requiring complicated switching circuits and timing devices. Balance of load between the motors is obtained for operation in either direction as well as when motoring or braking.

Since certain changes may be made in the above described construction, and different embodiments of the invention may be made without departing from the spirit and scope thereof, it is intended that all matter contained in the above description and shown in the accompanying drawing shall be considered as illustrative and not in a limiting sense.

We claim as our invention:

1. A control system for a motor having an armature and main and compounding field windings, circuit means connected to apply a reversible voltage to the armature, circuit means connected to apply a non-reversible voltage to the main field winding, means including a control generator connected to energize the compounding field winding and having a field winding energized according to the current in the motor armature, and driving means controlling the control generator responsive to the polarity of the voltage applied to the armature of the motor.

2. A control system for a motor having an armature and main and compounding field windings comprising, circuit means connected to energize the main field winding, additional circuit means connected to energize the armature from a reversible voltage source of electrical energy, a control generator having an armature connected to energize the motor compounding field winding and a field winding energized in accordance with the direction and magnitude motor armature current, and driving means disposed to drive the control generator in accordance with the direction and speed of operation of the motor.

3. A control system for a pair of motors each having armatures with separately excited field windings and compounding field windings, circuit means connecting the armatures to a reversible voltage source of electrical energy, a control generator having an armature connected to energize the compounding field windings and having control windings energized in accordance with the differential between the armature currents of the motors, and a motor driving the control generator energized from the reversible voltage source.

4. In a control system for a motor having a double armature with separately excited main field windings and compounding field windings for each, circuit means connecting the armatures in parallel circuit relation to a reversible voltage source of power, a control generator having an armature connected in circuit with the compounding field windings and a pair of control field windings energized in opposite senses in accordance with the motor armature currents, and a motor driving the control generator energized in accordance with the variable voltage applied to the motor armatures.

5. In a control system for a pair of main motors having armatures and field windings, circuit means connected to apply a reversible variable voltage to the armatures, a control generator having an armature connected to the motor field windings and having field windings energized differentially in accordance with the armature currents of the motors, and a control motor driving the control generator energized in accordance with the voltage applied to the main motor armatures.

6. In a control system for a motor having an armature with a separately excited field winding and a compounding field winding, circuit means connected to apply a reversible variable voltage to the armature, a control generator connected to energize the compounding field winding, a motor energized from said circuit means connected to drive the control generator, and means operable in response to reduction of the voltage applied to the motor armature below a predetermined value to increase the energization of the compounding field winding.

7. In a power system, a pair of motors having armatures connected to drive a common load and compounding field windings, circuit means connected to apply a common variable reversible voltage to the motor armatures, a control generator having an armature connected to energize the compounding field windings and a pair of field windings, circuit means energizing the field windings in opposite senses in accordance with the armature currents of the motors, a control motor energized in parallel circuit relation with the motor armatures connected to drive the control generator, means normally limiting the energization of the compounding field windings, and means connected to the circuit means operable to render said means ineffective when the voltage applied to the motor armatures is reduced below a predetermined value.

8. In a control system, a pair of twin motors each having a pair of armatures connected to drive a common load and each armature provided with a plurality of associated field windings, circuit means connected to apply a reversible voltage to said armatures, additional circuit means connected to apply a non-reversible voltage to one field winding associated with each of the armatures, a control generator for each twin motor responsive to a differential between the armature currents of said twin motor connected to energize another field winding associated with each armature of said twin motor to provide compounding characteristics, and an additional control generator responsive to a differential between the armature currents of the twin motors connected to energize yet another field winding associated with each armature of each motor so as to provide compounding characteristics for the twin motors, and a driving motor energized in accordance with the voltage applied to the motor armatures connected in driving relation with the control generators.

ALONZO F. KENYON.
WILLIAM R. HARDING.

REFERENCES CITED

The following references are of record in the file of this patent:

UNITED STATES PATENTS

| Number | Name | Date |
| --- | --- | --- |
| 827,322 | Parshall | July 31, 1906 |
| 2,182,631 | Kenyon | Dec. 5, 1939 |
| 2,254,043 | Lynn | Aug. 26, 1941 |
| 2,315,386 | Baldwin | Mar. 30, 1943 |